United States Patent [19]

Raffelson et al.

[11] 3,907,707

[45] Sept. 23, 1975

[54] VANADIUM CATALYSTS MADE WITH A TRIVALENT PHOSPHORUS COMPOUND

[75] Inventors: Harold Raffelson, Olivette; Roberto Lee, St. Louis; Thomas J. Dolan, Arnold, all of Mo.

[73] Assignee: Monsanto Company, St. Louis, Mo.

[22] Filed: Mar. 19, 1973

[21] Appl. No.: 342,325

[52] U.S. Cl................................. 252/437; 260/346.8
[51] Int. Cl.$^2$.......................................... B01J 27/14
[58] Field of Search..................................... 252/437

[56] References Cited
UNITED STATES PATENTS

| | | | |
|---|---|---|---|
| 3,238,253 | 3/1966 | Kerr | 252/437 X |
| 3,238,254 | 3/1966 | Kerr | 252/437 X |
| 3,277,017 | 10/1966 | Stefaniak | 252/437 |
| 3,320,331 | 5/1967 | Gasper et al. | 252/437 X |
| 3,342,849 | 9/1967 | Brill et al. | 252/437 X |
| 3,365,405 | 1/1968 | Fukui et al. | 252/437 X |
| 3,417,108 | 12/1968 | Stefaniak | 252/437 X |
| 3,474,041 | 10/1969 | Kerr | 252/437 X |
| 3,686,194 | 8/1972 | Hagedorn et al. | 252/437 X |

*Primary Examiner*—Paul F. Shaver
*Attorney, Agent, or Firm*—N. E. Willis; J. E. Maurer; F. D. Shearin

[57] ABSTRACT

An improved process was found for preparing a vanadium-containing catalyst wherein a tetravalent vanadium compound is provided from a pentavalent vanadium compound, comprising contacting the pentavalent vanadium compound with a trivalent phosphorus compound. The improved process is exemplified by the preparation of phosphorus-vanadium-oxygen catalysts, and particularly the preparation of phosphorus-vanadium-oxygen catalysts having a phosphorus to vanadium atom ratio of about 1:2 to about 2:1 comprising contacting a vanadium compound with a trivalent phosphorus compound, recovering a phosphorus-vanadium-oxygen precursor, and thereafter, calcining the precursor to form the catalysts. Phosphorous acid is preferred as the trivalent phosphorus compound.

10 Claims, No Drawings

VANADIUM CATALYSTS MADE WITH A TRIVALENT PHOSPHORUS COMPOUND

BACKGROUND OF THE INVENTION

This invention relates to catalysts containing vanadium, and particularly to catalysts containing tetravalent vanadium. The invention is exemplified by catalysts containing vanadium used in the manufacture of dicarboxylic acid anhydrides by the oxidation of hydrocarbons, and especially to the preparation of catalysts for producing maleic anhydride from saturated hydrocarbons, such as butane.

Maleic anhydride is of significant commercial interest throughout the world. It is used alone or in combination with other acids in the manufacture of alkyd and polyester resins. It is also a versatile intermediate for chemical synthesis. Significant quantities of maleic anhydride are produced each year to satisfy these needs.

The prior art teaches that vanadium catalysts are well suited to the production of maleic anhydride from hydrocarbons, usually unsaturated hydrocarbons, and the prior art further teaches that phosphorusvanadium-oxygen catalysts can be prepared in a number of ways. For example, these catalysts can be prepared by precipitating the vanadium and phosphorus compounds either with or without a carrier from a colloidal dispersion of the ingredients in an inert liquid, and thereafter calcining the precipitate. Catalysts can also be prepared by dissolving vanadium and phosphorus compounds in a common solvent and thereafter depositing the resulting phosphorus-vanadium-oxygen compound from solution on a carrier.

Many prior art procedures for the preparation of vanadium catalysts teach that it is preferable to reduce the vanadium in solution to the tetravalent state. Hence, the prior art teaches that vanadium compounds can be contacted with a reducing acid such as hydrochloric acid or oxalic acid, and then heated until the vanadium is reduced to a valence state of less than five before the compounds are subsequently recovered and used as catalysts.

Although the prior art procedures provide acceptable catalysts, there are attendant processing difficulties with such procedures. As an example, when oxalic acid is used, copious quantities of undesirable oxalate decomposition products are produced, and such oxalate decomposition products are frequently difficult to dispose of by conventional processing equipment. On the other hand, when hydrochloric acid is used as the reducing acid, chlorine and excess hydrochloric acid are evolved during the heating steps, and can be highly corrosive to the processing equipment used to prepare the catalyst. Furthermore, the prior art procedures require heating for long periods of time, sometimes as long as several days, to dissolve the vanadium compounds and reduce the vanadium to the tetravalent state.

These and other disadvantages of the prior art are overcome by the present process for preparing vanadium-containing catalysts which involves the use of a trivalent phosphorus compound.

SUMMARY OF THE INVENTION

It is an object of this invention to provide an improved process for the preparation of vanadium-containing catalysts. It is another object to provide a process for the preparation of phosphorus-vanadium-oxygen catalysts. It is another object to provide a process for preparing improved phosphorus-vanadium-oxygen catalysts suitable for converting non-aromatic hydrocarbons to maleic anhydride. It is another object to provide a process for preparing improved phosphorus-vanadium-oxygen catalysts particularly suitable for converting butane to maleic anhydride.

These and other objects are met in a process for preparing a catalyst containing tetravalent vanadium wherein some pentavalent vanadium is converted to tetravalent vanadium, the improvement which comprises contacting the pentavalent vanadium compound with a trivalent phosphorus compound. The process is exemplified herein in a process for preparing a phosphorus-vanadium-oxygen catalyst wherein a vanadium compound is contacted with a trivalent phosphorus compound under conditions to provide a substantial amount of tetravalent vanadium and to form a phosphorus-vanadium-oxygen precursor.

Broadly described, the catalysts of this invention are prepared by contacting a pentavalent vanadium compound with a trivalent phosphorus compound to provide a catalyst precursor containing a substantial amount of tetravalent vanadium followed by calcining.

For the purposes of this invention, the term "catalytic activity" means the ability of a catalyst to convert a particular feed stock such as butane at a particular temperature to other compounds. The term "selectivity" means the ratio of the moles of maleic anhydride obtained to the moles of hydrocarbon reacted. The term "yield" means the ratio of the moles of maleic anhydride obtained to the moles of hydrocarbon introduced into the reaction. The term "space velocity" means the hourly volume of gaseous feed expressed in cubic centimeters (cc) at 60°F and standard atmospheric pressure divided by the catalyst bulk volume expressed in cubic centimeters (cc), the term being expressed as cc/cc/hour.

An example of the usefulness of this invention to prepare tetravalent vanadium catalysts is presented wherein catalysts are prepared by contacting a pentavalent vanadium compound with a trivalent phosphorus compound in an acid medium to provide a phosphorus-vanadium-oxygen catalyst precursor containing a substantial amount of tetravalent vanadium, recovering the catalyst precursor, forming the catalyst precursor into structures for use in a maleic anhydride reactor and calcining the structured catalysts precursor to form the catalyst.

The vanadium compounds useful as a source of vanadium in the catalyst precursors are those known to the art to be useful for preparing catalysts to oxidize hydrocarbons. Suitable vanadium compounds include: vanadium oxides such as vanadium pentoxide and the like; vanadium oxyhalides such as vanadyl trichloride, vanadyl tribromide and the like; vanadium-containing acids such as metavanadic acid, pyrovanadic acid, and the like; vanadium salts such as ammonium metavanadate, vanadium sulfate, vanadium phosphate, vanadyl formate, vanadyl oxalate and the like. However, vanadium pentoxide is preferred.

The trivalent phosphorus compounds useful to provide a substantial amount of tetravalent vanadium in the catalyst precursors are also those known to the art. Suitable trivalent phosphorus compounds include: phosphorous acids such as orthophosphorous acid, pyrophosphorous acid, metaphosphorous acid, hypophosphorous acid and the like; phosphorus trihalides such as phosphorus tribromide, phosphorus trichloride, phosphorus triiodide and the like; trivalent phosphorus oxides such as phosphorus trioxide and the like; organic phosphites i.e., compounds of the type $P(OR)_3$ where R is an aryl or alkyl group such as trimethyl phosphite, triethyl phosphite, tripropyl phosphite, ethyl propyl phosphite and the like. However, phosphorous acids, such as orthophosphorous acid, are preferred.

As an additional source of phosphorus in the catalyst precursors, pentavalent phosphorus compounds known to the art to be useful for preparing catalysts to oxidize hydrocarbons can be used. Suitable pentavalent phosphorus compounds include: phosphoric acids such as metaphosphoric acid, orthophosphoric acid, triphosphoric acid, pyrophosphoric acid and the like; phosphorus oxides such as phosphorus pentoxide and the like; phosphorus halides such as phosphorus oxyiodide, phosphorus pentachloride, phosphorus oxybromide and the like; and organophosphorus compounds such as ethyl phosphate, methyl phosphate and the like. However, phosphoric acids, such as orthophosphoric acid, and phosphorus pentoxide are preferred.

To prepare the catalyst precursors by the process of the present invention, a predetermined amount of vanadium compound in which the vanadium is in the pentavalent state is contacted in an acid medium with a sufficient amount of trivalent phosphorus compound to provide a substantial amount i.e., at least 50 atom %, of tetravalent vanadium. It is preferable to use a stoichiometric amount of trivalent phosphorus compound to provide tetravalent vanadium, and even more preferable to use an excess of the stoichiometric amount of trivalent phosphorus compound to insure that substantially all the vanadium is in the tetravalent state. It is preferred to use phosphorous acid as the trivalent phosphorus compound which provides an acid medium to form the precursor and provides the tetravalent vanadium. The acid solution containing the trivalent phosphorus compound and the vanadium compound are heated until a blue solution is obtained, indicating that a substantial amount of the vanadium is in the tetravalent state. The amount of the time required to dissolve the phosphorus and vanadium compounds and to provide a substantial amount of the vanadium in the tetravalent state to form the catalyst precursors varies from batch to batch, depending upon the compounds used as starting materials and the temperature at which the compounds are heated. However, as will occur to those skilled in the art, an aliquot of the solution can be analyzed to insure that a major part of the vanadium is in the tetravalent state. In general, however, heating the solution to at least 100°C for about four hours is sufficient.

The atom ratio of phosphorus to vanadium in the precursor is important since it controls the phosphorus to vanadium atom ratio in the final catalyst. When phosphorus-vanadium-oxygen precursors contain a phosphorus to vanadium atom ratio below about 1:2 or above about 2:1, the yield of maleic anhydride using the catalyst prepared from these precursors is so low that it is not of commercial significance. It is preferred that phosphorus-vanadium-oxygen precursors have a phosphorus to vanadium atom ratio in the range of about 1:1 to about 1.5:1. When the catalyst is used to convert a feed that is primarily butane to maleic anhydride, it is even more preferable that the precursor have a phosphorus to vanadium atom ratio of about 1:1 to about 1.2:1, say about 1.1:1.

In addition to the trivalent phosphorus compounds, additional phosphorus may be used to achieve the desired phosphorus to vanadium atom ratio in the phosphorus-vanadium-oxygen precursors. While trivalent phosphorus compounds can be used as the only source of phosphorus, pentavalent phosphorus compounds can be used as an additional source of phosphorus and their use with the trivalent phosphorus compounds is preferred because they dilute the concentration of the trivalent phosphorus compound and reduce the likelihood of forming divalent or trivalent vanadium compounds.

After the vanadium and phosphorus compounds are mixed and a substantial amount of the vanadium is in the tetravalent state, it is necessary to recover the phosphorus-vanadium-oxygen precursors. Techniques for recovering the phosphorus-vanadium-oxygen precursors from solution are well-known to those skilled in the art. For example, the precursors can be deposited from aqueous solution on a carrier, such as alumina or titania, or the precursors can be dried by gentle heating to provide solid phosphorus-vanadium-oxygen precursors.

After the phosphorus-vanadium-oxygen precursors are recovered, they are then formed into structures suitable for use in a maleic anhydride reactor. Techniques for forming appropriate structures form precursors for use in a fluidized bed reactor or in a fixed tube heat exchanger type reactor are well-known to those skilled in the art. For example, the precursors can be structured for use in a fluidized bed reactor by depositing the phosphorus-vanadium-oxygen precursors on a carrier. Alternatively, dried precursors can be comminuted for use in a fluidized bed reactor. On the other hand, precursors can be structured for use in a fixed tube reactor by prilling or tabletting the precursors.

After the phosphorus-vanadium-oxygen precursors are formed into the structures which will be used in a maleic anhydride reactor, the precursors are then calcined in an inert atmosphere, such as nitrogen or a noble gas, at temperatures of about 350°C to about 600°C for at least about 2 hours, to provide the catalysts of the present invention.

However, for those phosphorus-vanadium-oxygen precursors having a phosphorus to vanadium atom ratio of greater than 1:1, it is preferred to convert part of the tetravalent vanadium to pentavalent vanadium during the calcination step. The tetravalent vanadium can be converted to pentavalent vanadium by calcining the precursor in air at temperatures of about 350°C to about 600°C until about 20 to about 80 atom % of the vanadium has been converted to pentavalent vanadium. If more than about 80 atom % of the vanadium is converted to pentavalent vanadium, usually caused by calcining too long or at too high a temperature, the selectivity of the resultant catalyst and the yield of maleic anhydride decrease markedly. On the other hand, conversion of less than about 20 atom % of the vanadium during air calcination does not seem to be more beneficial than calcination in an inert atmosphere. It has been found that calcination at 500°C for about 4 hours is generally sufficient.

After the phosphorus-vanadium-oxygen precursor has been calcined, the catalyst thus formed is placed in a reactor used to convert hydrocarbons to maleic anhydride. Thereafter, a hydrocarbon and air mixture can be passed through the catalyst at temperatures between about 350°C and 600°C at concentrations of from about 1 to about 10 mole % hydrocarbon at a space velocity up to 3000 cc/cc/hour to produce maleic anhydride.

However, as is well-known in the art, the initial yield of maleic anhydride may be low, and if this is the case, the catalyst can be "conditioned" by passing low concentrations of hydrocarbon in air at low space velocities through the catalyst for a period of time before production operations begin.

The catalysts of the present invention are useful in a variety of reactors to convert hydrocarbons to maleic anhydride. Both fluidized bed reactors and fixed tube heat exchanger type reactors are satisfactory and the details of the operation of such reactors are well-known to those skilled in the art. The reaction to convert hydrocarbons to maleic anhydride requires only passing the hydrocarbons admixed with a free oxygen containing gas, such as air or oxygen enriched air, through the catalyst at elevated temperatures. The hydrocarbon-air mixture is passed through the catalysts at a concentration of about 1 to about 10 mole % hydrocarbon at a space velocity of about 100 to 3000 cc/cc/hour and at temperatures between about 350°C and about 600°C to provide high maleic anhydride yields.

Maleic anhydride produced by using the catalysts of this invention can be recovered by any number of means well-known to those skilled in the art. For example, the maleic anhydride can be recovered by direct condensation or by absorption in suitable media with subsequent separation and purification of the anhydride.

A large number of non-aromatic hydrocarbons having from 4 to 10 carbon atoms can be converted to maleic anhydride using the catalysts of the present invention. It is only necessary that the hydrocarbon contain not less that 4 carbon atoms in a straight chain. As an example, the preferred saturated hydrocarbon is butane, but isobutane which does not contain 4 carbon atoms in a straight chain, is not satisfactory for conversion to maleic anhydride although its presence is not harmful. In addition to butane, other saturated hydrocarbons within the scope of this invention include the pentanes, the hexanes, the heptanes, the octanes, the nonanes, the decanes or mixtures of any of these with or without butane. In addition to the saturated hydrocarbons, unsaturated hydrocarbons can be used. The preferred unsaturated hydrocarbon is butene, but other unsaturated hydrocarbons within the scope of this invention include butadiene, the pentenes, the hexenes, the heptenes, the octenes, the nonenes, the decenes, or mixtures of any of these with or without butene. Cyclic compounds such as cyclopentane or cyclopentene or oxygenated compounds such as furan, dihydrofuran, or even tetrahydrofurfural alcohol are satisfactory. Furthermore, the aforementioned feed stocks are not necessarily pure substances, but can be technical hydrocarbons.

DESCRIPTION OF THE PREFERRED EMBODIMENTS

In the preferred method of making the catalysts of this invention, a pentavalent vanadium compound, such as vanadium pentoxide, is contacted with a mixture of phosphorous acid and phosphoric acid in such amounts that the phosphorus to vanadium atom ratio is about 1.1:1. The acid mixture should contain phosphorous acid in excess of the stoichiometric compound required to reduce all the vanadium to tetravalent vanadium. The mixture of phosphorus and vanadium compounds is then heated to form a phosphorus-vanadium-oxygen precursor. Heating at 100°C for as long as 24 hours may be required to provide tetravalent vanadium and form the precursor, but the heating time can be shortened substantially by heating the mixture up to as high as 500°C at super-atmospheric pressures. It is preferred to place the mixture of phosphorus and vanadium compounds in a closed system at room temperature, and then heat the mixture to about 150°C in the closed system such as a stirred autoclave for about 3 hours to provide tetravalent vanadium and to form the phosphorus-vanadium-oxygen precursor.

In the next step, the aqueous solution containing the phosphorus-vanadium-oxygen precursor is evaporated to dryness. Then, from about 10 to about 40 weight % water is added to the precursor to form a putty. Alternatively, only so much of the water from the aqueous solution of phosphorus-vanadium-oxygen precursor is removed as is necessary to form a viscous putty. The amount of water in the putty is not critical provided that there is sufficient water to permit forming the putty into a suitable structure as by extrusion or pelleting, but not so much water as to cause the putty to readily slump after it is formed. A putty containing less than about 10 weight % water is difficult to extrude whereas a putty containing greater than about 40 weight % water will normally slump and not hold its shape. However, it should be noted that various additives such as a gelling agent or a lubricant can be added to the putty that can alter the extrusion properties of the putty, as will occur to those skilled in the art. The putty of precursor and water is then structured by extruding the putty through a die, drying the extrudate and dividing the extrudate into pellets or tablets. Alternatively, the extrudate can be divided into pellets before drying and this latter procedure is preferred.

Thereafter, the structured precursors are calcined at 500°C for about 4 hours in air to form the phosphorus-vanadium-oxygen catalysts.

This invention is illustrated by, but not limited to, the following examples.

EXAMPLE I

This example illustrates the preparation of catalysts by the process of this invention for use in a fixed bed reactor.

A phosphorus-vanadium-oxygen catalyst was prepared by slowly adding 133.08 grams of vanadium pentoxide to a mixture of 450 milliliters of water, 50.6 grams of 85% phosphoric acid and 91.7 grams of 99.4% phosphorous acid. The phosphorus to vanadium atom ratio was about 1.05:1. The amount of phosphorous acid was equivalent to about 50% in excess of the phosphorous acid required to convert pentavalent vanadium to tetravalent vanadium. The mixture of vanadium and phosphorus compounds was placed in an autoclave, which was then heated to 100°C and thereafter sealed. Then, the autoclave containing the vanadium and phosphorus compounds was heated to about 145°C for about 3 hours. After the autoclave was cooled and opened, a phosphorus-vanadium-oxygen precursor was observed in a water suspension.

The precursor was separated from the water by filtration and the precursor was washed with water several times. Then, about 20 weight % water, based on the weight of the precursor, was mixed with the precursor to form a viscous putty, which was then extruded through a 7/32-inch diameter die. The extrudate was then cut into pellets of about 7/32-inch lengths. The structured putty was then allowed to air dry, heated to about 90°C in an oven to evaporate any remaining water, and then calcined at about 500°C for 4 hours to form a phosphorus-vanadium-oxygen catalyst.

About 50 cc of the catalyst pellets were then charged to a 1-inch outside diameter fixed bed glass reactor, which is believed to give results comparable to those obtained in a production reactor. The catalyst was conditioned by passing a 1.5 mole percent butane in air mixture over the catalyst at a space velocity of about 1327 cc/cc/hour at a temperature of about 440°C for about 16 hours. Thereafter, maleic anhydride was produced using a 3 mole percent butane in air mixture at a space velocity of about 2800 cc/cc/hour at 440°C. After maleic anhydride had been produced for 50 hours, the yield was about 39%.

EXAMPLE II

This example illustrates the preparation of catalysts by the process of this invention using 10% phosphorous acid in excess of the stoichiometric amount required to provide tetravalent vanadium.

A catalyst was prepared as in Example I except that 133.08 grams of vanadium pentoxide was added to a mixture of 450 milliliters of water, 84.4 grams of 85% phosphoric acid and 66.04 grams of 99.4% phosphorous acid to provide about 10% phosphorous acid in excess of the stoichiometric amount required to provide tetravalent vanadium. The putty obtained by the process was extruded through a 1/16-inch diameter die, and the extruded putty was cut into 1/16-inch lengths to form pellets. After the pellets were dried and calcined, they were placed in a ½-inch diameter fixed tube reactor. Thereafter, maleic anhydride was produced at 440°C using a 5 mole % butane in air mixture at a space velocity of about 2800 cc/cc/hour. After 50 hours of maleic anhydride production, the yield of maleic anhydride was about 35%.

EXAMPLE III

This example illustrates the preparation of catalysts by the process of this invention for use in a fluidized bed reactor.

A catalyst was prepared as in Example II except that instead of forming a putty from the washed precursor, the precursor was dried on a steam bath and then comminuted by grinding to a powder of 45 to 325 mesh U.S. Standard Sieve. When this powder was placed in a 1.3-inch inside diameter glass fluidized bed reactor and a mixture of 4 mole percent butane in air was passed through the catalyst at a temperature of about 463°C and at a space velocity of 400 cc/cc/hour, maleic anhydride was obtained at a yield of 40.9% after 12 hours of production.

EXAMPLE IV

This example illustrates the preparation of catalysts by the process of this invention for use in a fluidized bed reactor.

A catalyst was prepared as in Example II except that instead of filtering the precursor from the water suspension, the precursor in the water suspension was placed on a steam bath and evaporated to dryness. The dry precursor remaining was thereafter comminuted by grinding the precursor to a powder. Then, the powder was placed in a laboratory scale fluidized bed reactor. Using a feed of 5 mole % butane in air mixture at a space velocity of 400 cc/cc/hour, maleic anhydride was produced at 35.3% yield after 12 hours of production at 463°C.

EXAMPLE V

This example illustrates the preparation of catalysts by the process of this invention using a phosphorus trihalide.

A catalyst is prepared as in Example I except that to 450 milliliters of water is added 51 grams of phosphorus trichloride, which hydrolyzes to form phosphorous acid and hydrochloric acid, 41.5 grams of 85% phosphoric acid, and 133 grams of vanadium pentoxide to form a precursor having a phosphorus to vanadium atom ratio of about 1.05:1. After 50 hours of production at 440°C, maleic anhydride is produced at a yield of about 32% using 3 mole % butane in air at a space velocity of about 2800 cc/cc/hour.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. As an example, additives may be added to the catalyst to improve its yield or to lower the operating temperature. Accordingly, modifications are contemplated which can be made without departing from the spirit of the described invention.

What is claimed is:

1. In a process for preparing a phosphorus-vanadium-oxygen catalyst wherein a pentavalent vanadium compound is contacted with a phosphorus compound under conditions to provide a substantial amount of tetravalent vanadium and to form a phosphorus-vanadium-oxygen precursor, the improvement which comprises contacting the pentavalent vanadium compound with a trivalent phosphorus compound.

2. In a process of claim 1 wherein the phosphorus to vanadium atom ratio is about 1:1 to about 2:1.

3. In a process of claim 1 wherein the phosphorus to vanadium atom ratio is about 1:1 to about 1.1:1.

4. In a process of claim 1 wherein the phosphorus to vanadium atom ratio is about 1.1:1.

5. In a process of claim 1 wherein the amount of trivalent phosphorus compound is at least the stoichiometric amount required to provide tetravalent vanadium.

6. In a process of claim 1 wherein the travalent phosphorus compound is a phosphorous acid.

7. In a process of claim 1 wherein the trivalent phosphorus compound is orthophosphorous acid.

8. In a process of claim 1 which comprises contacting a vanadium compound with a trivalent phosphorus compound, and heating the vanadium compound and the phosphorus compound in a closed system at above 100°C for a time sufficient to form a phosphorus-vanadium-oxygen precursor.

9. In a process of claim 1 wherein the pentavalent vanadium compound is contacted with phosphorus trichloride in the presence of water.

10. In a process of claim 1 wherein the catalyst has a phosphorus to vanadium atom ratio from about 1:2 to about 2:1 prepared by contacting vanadium pentoxide with phosphoric acid and phosphorous acid.

* * * * *